UNBALANCED-TO-GROUND TWO-TO-FOUR-WIRE CONNECTION

Filed Dec. 29, 1950

INVENTOR
P. G. EDWARDS
BY
Ralph T. Holcomb
ATTORNEY

Patented Feb. 17, 1953 2,629,024

UNITED STATES PATENT OFFICE 2,629,024

UNBALANCED-TO-GROUND TWO-TO-FOUR-WIRE CONNECTION

Paul G. Edwards, Verona, N. J., assignor to Bell Telephone Laboratories, Incorporated, New York, N. Y., a corporation of New York Application December 29, 1950, Serial No. 203,276

15 Claims. (Cl. 179—170)

This invention relates to wave transmission systems and more particularly to a terminating set for use with two-way circuits.

The principal object of the invention is to connect a two-way transmission circuit to an input circuit and an output circuit.

Other objects are to improve the performance and reduce the cost of terminating sets for use with unbalanced-to-ground circuits.

In a wave transmission system employing a two-way transmission circuit it is necessary to provide a terminating set for connecting thereto an input circuit and an output circuit without undesirable interaction. Terminating sets are known which are satisfactory for use with balanced-to-ground circuits, but when these are adapted for use with unbalanced-to-ground circuits, four balanced-to-unbalanced transformers have heretofore been required. These transformers restrict the band width and increase the loss within the band.

The terminating set in accordance with the present invention is adapted for use with unbalanced-to-ground circuits but requires no transformers, thus permitting the transmission of a wider band with less loss. The circuit comprises a four-terminal bridging network made up of four impedance arms, one of which includes means for reversing the phase of the current therein. The other three arms preferably have impedances which are substantially equal and substantially non-reactive. In the embodiment disclosed, by way of example only, the phase-reversing means comprise an amplifier. In accordance with a feature of the invention the impedance to ground from diagonally opposite, that is, conjugate, bridge terminals are made equal, and the loss between the input circuit and the two-way circuit is minimized, by properly choosing the impedance of each of the bridge arms.

Figure 1:
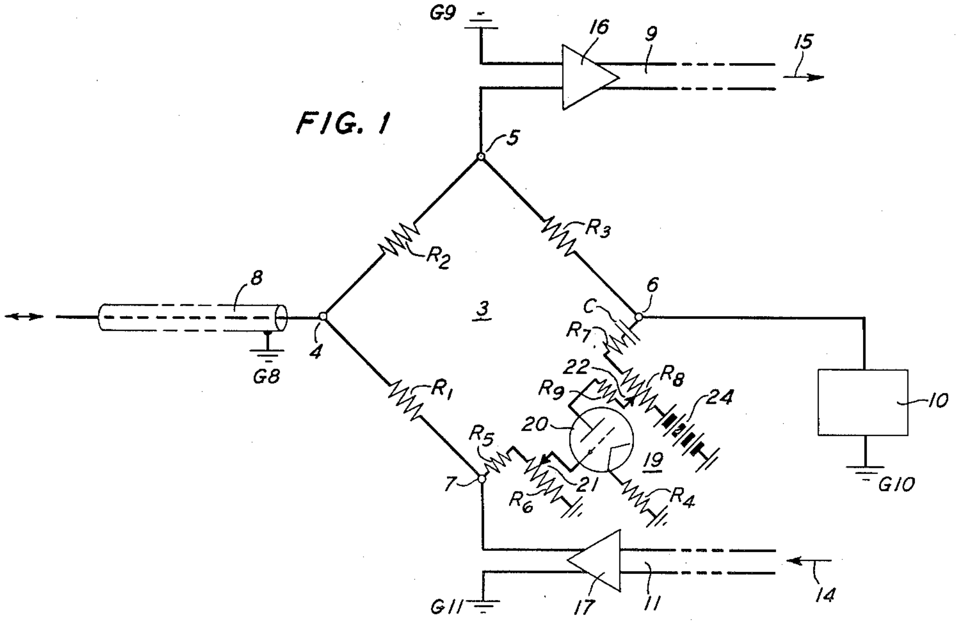
Figure 2:
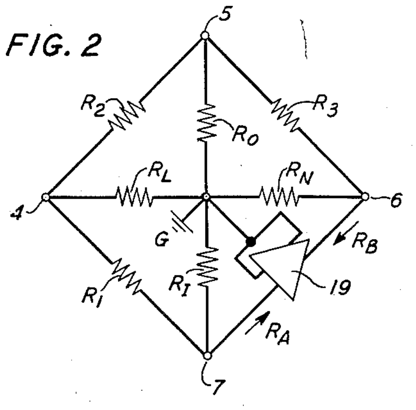

The nature of the invention will be more fully understood from the following detailed description and by reference to the accompanying drawings, of which:

Fig. 1 is a schematic circuit showing one embodiment of a terminating set in accordance with the invention connected to unbalanced-to-ground circuits; and Fig. 2 shows schematically a simplified circuit for the system of Fig. 1.

Taking up the figures in greater detail, Fig. 1 shows a terminating set in accordance with the invention in the form of a four-terminal bridge 3 to the terminals 4, 5, 6, and 7 of which are connected, respectively, a two-way transmission circuit 8, an output circuit 9, a balancing network 10, and an input circuit 11. All of the circuits 8, 9, and 11 are of the unbalanced-to-ground type and one side of each is grounded as shown, respectively, at $G_8$, $G_9$, and $G_{11}$.

The circuit 8, whcih may be of the coaxial conductor type as shown, is used for two-way signal transmission as indicated by the double-pointed arrow. The transmission circuit 8 is balanced by the network 10 connected to the diagonally opposite terminal 6 of the bridge 3 and grounded as shown at $G_{10}$.

The circuits 9 and 11 are connected, respectively, to the pair of conjugate terminals 5 and 7 of the bridge 3. The circuit 11 supplies to the circuit 8 alternating-current input signals from some suitable source, not shown, as indicated by the arrow 14. The circuit 9 delivers the output signals from the circuit 8 to a suitable load, not shown, as indicated by the arrow 15. These circuits may include one or more amplifiers such as 16 and 17, if required.

The bridge 3 comprises three normally equal, resistive arms of impedance $R_1$, $R_2$, and $R_3$ connected, respectively, between the terminals 4—7, 4—5, and 5—6. In order to provide a high loss from the input circuit 11 to the output circuit 9, and also from the two-way circuit 8 to the balancing network 10, there is provided in the fourth arm of the bridge 3 an amplifier 19 for reversing the phase of the current therein. This fourth arm of the bridge may, if desired, be interchanged with the arm comprising $R_2$ with equally satisfactory results. In this case the amplifier should be pointed so as to transmit energy from terminal 4 to terminal 5 of the bridge. The amplifier 19 comprises a thermionic triode 20 the cathode of which is connected to ground through a resistor $R_4$ and is supplied with current in the usual manner from some source, not shown. The grid of the triode 20 is connected to the bridge terminal 7 through a fixed resistor $R_5$ and a potentiometer $R_6$ which is grounded at one end and tapped at an adjustable point 21. The plate of the triode 20 is connected to the terminal 6 through a fixed resistor $R_7$, a potentiometer $R_8$ tapped at an adjustable point 22, and a second fixed resistor $R_9$. The plate current is supplied by the battery 24 connected between the resistor $R_8$ and ground. The blocking capacitor C prevents direct current from the battery 24 from entering the other arms of the bridge 3. It should present a low impedance, as compared to the impedance of the bridge arms, for the transmitted frequencies.

In the simplified circuit shown in Fig. 2 the elements $R_1$, $R_2$, $R_3$, and 19 forming the four bridge arms represent the similarly designated elements of Fig. 1. The impedance branches $R_L$, $R_N$, $R_I$, and $R_O$ represent, respectively, the characteristic impedance of the two-way transmission circuit 8, the impedance of the balancing network 10, the impedance of the input circuit 11, and the impedance of the output circuit 9. The impedance $R_A$ is the input impedance of the amplifier 19 effective between the terminal 7 and the common ground G, and $R_B$ is the output impedance of the amplifier effective between the terminal 6 and ground.

The impedances $R_L$ and $R_N$ are substantially equal and each is ordinarily substantially equal to $R_I$ and to $R_O$; that is, $$R_L=R_N=R_I=R_O=R \qquad (1)$$

In order to make the impedances between each of the bridge terminals 4, 5, 6 and 7 and ground G equal to the impedance of the circuit or network connected thereto, and at the same time minimize the transmission loss between the input circuit 11 and the two-way circuit 8, I have found that there is an optimum ratio of $\sqrt{2}$ between certain of the bridge arm impedances and R. That is, $$R_1=R_2=R_3=R\sqrt{2} \qquad (2)$$

The impedance $R_A$ should be approximately equal to the total impedance to ground from bridge terminal 7, without $R_A$ or amplifier 17 or input circuit 11 connected. Similarly, the impedance $R_B$ should be approximately equal to the total impedance to ground from bridge terminal 6, without $R_B$ or network 10 connected. Potentiometers $R_6$ and $R_8$ are adjusted to give the maximum transmission loss from input circuit 11 to output circuit 9.

As an illustrative example, if each of the impedances $R_L$, $R_N$, $R_I$, and $R_O$ is equal to 600 ohms, a satisfactory terminating set will be provided if the various elements have approximately the following values:

$R_1=R_2=R_3=600\sqrt{2}=848$ ohms
$R_4=250$ ohms
$R_5=R_7=200$ ohms
$R_6=R_8=1000$ ohms
$R_9=5000$ ohms
$C=125$ microfarads.

What is claimed is:

1. In combination, four impedance arms connected together to form a four-terminal bridge and an unbalanced-to-ground, two-way wave transmission circuit, an unbalanced-to-ground input circuit, an impedance approximately matching the impedance of said transmission circuit, and an unbalanced-to-ground output circuit connected, respectively, to the terminals of said bridge in the order recited, one of said arms including means for reversing the phase of the current therein.

2. The combination in accordance with claim 1 in which the other three of said arms have impedances which are substantially equal and substantially non-reactive.

3. The combination in accordance with claim 1 in which each of the other three of said arms has an impedance which is substantially equal to the $\sqrt{2}$ times the characteristic impedance of said transmission circuit.

4. The combination in accordance with claim 3 in which said input circuit and said output circuit each have an impedance substantially equal to the impedance of said transmission circuit.

5. The combination in accordance with claim 1 in which said phase-reversing means comprise an amplifier.

6. The combination in accordance with claim 5 in which said one arm includes two potentiometers for connecting said amplifier thereto.

7. The combination in accordance with claim 5 in which said one arm includes a blocking capacitor connected in series with said amplifier.

8. In combination, four impedance arms connected together to form a four-terminal bridge and an unbalanced-to-ground, two-way wave transmission circuit, an unbalanced-to-ground input circuit, a balancing network for said transmission circuit and an unbalanced-to-ground output circuit connected, respectively, to the terminals of said bridge in the order recited, one of said arms including means for reversing the phase of the current therein.

9. The combination in accordance with claim 8 in which the other three of said arms have impedances which are substantially equal and substantially non-reactive.

10. The combination in accordance with claim 8 in which said phase-reversing means comprise an amplifier.

11. The combination in accordance with claim 10 in which said one arm includes two potentiometers for connecting said amplifier thereto.

12. The combination in accordance with claim 10 in which said one arm includes a blocking capacitor connected in series with said amplifier.

13. The combination in accordance wtih claim 8 in which said one arm is connected between said input circuit and said balancing network.

14. The combination in accordance with claim 8 in which each of the other three of said arms has an impedance which is substantially equal to $\sqrt{2}$ times the characteristic impedance of said transmission circuit.

15. The combination in accordance with claim 14 in which said input circuit and said output circuit each have an impedance substantially equal to said characteristic impedance of said transmission circuit.

PAUL G. EDWARDS.

REFERENCES CITED

The following references are of record in the file of this patent:

UNITED STATES PATENTS

| Number | Name | Date |
|---|---|---|
| 1,541,668 | Strauss | June 9, 1925 |
| 1,762,768 | Dickieson | June 10, 1930 |
| 2,017,180 | Cowan | Oct. 15, 1935 |
| 2,129,990 | Fremery | Sept. 13, 1938 |
| 2,534,624 | Posthumus | Dec. 19, 1950 |

FOREIGN PATENTS

| Number | Country | Date |
|---|---|---|
| 158,536 | Great Britain | Mar. 23, 1922 |